United States Patent
Bi et al.

(10) Patent No.: US 9,241,324 B2
(45) Date of Patent: Jan. 19, 2016

(54) MAPPING AND RESOURCE ALLOCATION METHOD FOR RELAY LINK-PHYSICAL DOWNLINK SHARED CHANNEL

(75) Inventors: Feng Bi, Shenzhen (CN); Jin Yang, Shenzhen (CN); Ming Yuan, Shenzhen (CN); Feng Liang, Shenzhen (CN); Shuanshuan Wu, Shenzhen (CN); Jing Jiang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 285 days.

(21) Appl. No.: 13/258,369

(22) PCT Filed: Dec. 23, 2010

(86) PCT No.: PCT/CN2010/080192
§ 371 (c)(1),
(2), (4) Date: Jul. 4, 2012

(87) PCT Pub. No.: WO2011/082630
PCT Pub. Date: Jul. 14, 2011

(65) Prior Publication Data
US 2012/0263097 A1 Oct. 18, 2012

(30) Foreign Application Priority Data
Jan. 7, 2010 (CN) .......................... 2010 1 0042713

(51) Int. Cl.
*H04L 5/00* (2006.01)
*H04W 72/04* (2009.01)
(Continued)

(52) U.S. Cl.
CPC .............. *H04W 72/04* (2013.01); *H04L 5/0007* (2013.01); *H04L 5/0032* (2013.01);
(Continued)

(58) Field of Classification Search
CPC ...................................................... H04L 1/0068
USPC .......... 370/204, 215, 264, 315, 319, 328, 329
See application file for complete search history.

(56) References Cited

U.S. PATENT DOCUMENTS 5,677,209 A 10/1997 Shon et al.
5,864,549 A * 1/1999 Honkasalo et al. ........... 370/335
(Continued)

FOREIGN PATENT DOCUMENTS

CN 1139295 A 1/1997
CN 101064705 A 10/2007
(Continued)

OTHER PUBLICATIONS

Type 2 Relay Transmission Modes and Subframe Structure, Oct. 16, 2009, 22 pages.
(Continued)

*Primary Examiner* — Andrew Lai
*Assistant Examiner* — Andrew C Lee
(74) *Attorney, Agent, or Firm* — Oppedahl Patent Law Firm (57) ABSTRACT

The present disclosure provides a mapping and resource allocation method for R-PDSCH, including: when resources allocated for an R-PDCCH overlap with resources allocated for the R-PDSCH, data of the R-PDSCH is not mapped or sent on over-lapped resources, or the data of the R-PDSCH to be sent on the over-lapped resources is punctured; the data of the R-PDSCH is mapped and sent on all or partial resources which are not occupied by the R-PDCCH; a receiving end receives data according to the mapping method for the R-PDSCH; wherein a resource allocation mode corresponding to a shared channel in an LTE system is reused or a grouping-tree resource allocation mode is used to allocate resources for the R-PDSCH.

35 Claims, 3 Drawing Sheets (51) Int. Cl.
*H04W 84/04* (2009.01)
*H04L 1/00* (2006.01)

(52) U.S. Cl.
CPC ........... *H04L 5/0062* (2013.01); *H04L 5/0073* (2013.01); *H04L 1/0068* (2013.01); *H04W 72/042* (2013.01); *H04W 84/047* (2013.01)

(56) References Cited

U.S. PATENT DOCUMENTS

| | | | |
|---|---|---|---|
| 6,377,540 B1* | 4/2002 | Hogberg et al. | 370/216 |
| 6,944,146 B1 | 9/2005 | Barany et al. | |
| 7,006,475 B1 | 2/2006 | Suzuki et al. | |
| 7,558,229 B2* | 7/2009 | Bachl et al. | 370/313 |
| 7,885,176 B2* | 2/2011 | Pi et al. | 370/204 |
| 8,009,606 B2* | 8/2011 | Seo et al. | 370/319 |
| 8,223,712 B2* | 7/2012 | Kim et al. | 370/329 |
| 8,233,458 B2* | 7/2012 | Ahn et al. | 370/335 |
| 8,335,466 B2* | 12/2012 | Cai et al. | 455/7 |
| 8,379,601 B2* | 2/2013 | Love et al. | 370/334 |
| 8,583,128 B2* | 11/2013 | Choi et al. | 455/448 |
| 8,599,782 B2* | 12/2013 | Chung et al. | 370/329 |
| 8,630,653 B2* | 1/2014 | Ahn et al. | 455/452 |
| 8,724,648 B2* | 5/2014 | Zeng et al. | 370/436 |
| 8,842,617 B2* | 9/2014 | Chung et al. | 370/329 |
| 8,934,417 B2* | 1/2015 | Nory et al. | 370/329 |
| 2004/0179557 A1* | 9/2004 | Tong et al. | 370/537 |
| 2005/0094561 A1* | 5/2005 | Raaf | 370/235 |
| 2005/0094605 A1 | 5/2005 | Sun et al. | |
| 2006/0246917 A1 | 11/2006 | Jin et al. | |
| 2007/0218915 A1* | 9/2007 | Yang et al. | 455/450 |
| 2007/0268812 A1 | 11/2007 | Yoon et al. | |
| 2008/0075181 A1 | 3/2008 | Xia et al. | |
| 2008/0232495 A1* | 9/2008 | Yu et al. | 375/260 |
| 2008/0304588 A1* | 12/2008 | Pi | 375/260 |
| 2009/0018043 A1 | 1/2009 | Beckers et al. | |
| 2009/0018661 A1 | 1/2009 | Kim et al. | |
| 2009/0046693 A1* | 2/2009 | Nory et al. | 370/343 |
| 2009/0073922 A1* | 3/2009 | Malladi et al. | 370/328 |
| 2009/0129362 A1 | 5/2009 | Higuchi et al. | |
| 2009/0143072 A1 | 6/2009 | Montojo et al. | |
| 2009/0180433 A1* | 7/2009 | Ahn et al. | 370/329 |
| 2009/0186613 A1* | 7/2009 | Ahn et al. | 455/434 |
| 2009/0257390 A1 | 10/2009 | Ji et al. | |
| 2009/0303951 A1* | 12/2009 | Lunttila et al. | 370/329 |
| 2009/0318183 A1* | 12/2009 | Hugl et al. | 455/522 |
| 2010/0008317 A1* | 1/2010 | Bhattad et al. | 370/329 |
| 2010/0034077 A1* | 2/2010 | Ishii et al. | 370/210 |
| 2010/0056197 A1* | 3/2010 | Attar et al. | 455/522 |
| 2010/0080166 A1* | 4/2010 | Palanki et al. | 370/315 |
| 2010/0099429 A1* | 4/2010 | Ishii et al. | 455/452.1 |
| 2010/0103901 A1* | 4/2010 | Miki et al. | 370/330 |
| 2010/0110964 A1* | 5/2010 | Love et al. | 370/312 |
| 2010/0135237 A1* | 6/2010 | Papasakellariou et al. | 370/329 |
| 2010/0142467 A1* | 6/2010 | Tiirola et al. | 370/329 |
| 2010/0195614 A1* | 8/2010 | Nimbalker et al. | 370/330 |
| 2010/0226326 A1* | 9/2010 | Ahn et al. | 370/329 |
| 2010/0232373 A1* | 9/2010 | Nory et al. | 370/329 |
| 2010/0279628 A1* | 11/2010 | Love et al. | 455/70 |
| 2011/0044391 A1* | 2/2011 | Ji et al. | 375/260 |
| 2011/0075684 A1* | 3/2011 | Zeng et al. | 370/475 |
| 2011/0080896 A1* | 4/2011 | Krishnamurthy et al. | 370/336 |
| 2011/0164542 A1* | 7/2011 | Cai et al. | 370/312 |

FOREIGN PATENT DOCUMENTS

| | | |
|---|---|---|
| CN | 101132267 A | 2/2008 |
| CN | 101204101 A | 6/2008 |
| CN | 101299634 A | 11/2008 |
| CN | 101350940 A | 1/2009 |
| CN | 101516104 A | 8/2009 |
| CN | 101527961 A | 9/2009 |
| EP | 1983671 A1 | 10/2008 |
| EP | 2104391 A1 | 9/2009 |
| JP | 2012503922 A | 2/2012 |
| JP | 2013509127 A | 3/2013 |
| RU | 2364047 C2 | 8/2009 |
| RU | 2368083 C2 | 9/2009 |
| RU | 2515548 C2 | 5/2014 |
| WO | 2007136212 A2 | 11/2007 |
| WO | 2009058906 A2 | 5/2009 |

OTHER PUBLICATIONS

International Search Report in international application No. PCT/CN2010/080192, mailed on Mar. 31, 2011.
English Translation of the Written Opinion of the International Search Authority in international application No. PCT/CN2010/080192, mailed on Mar. 31, 2011.
Supplementary European Search Report in European application No. 10841973.0, mailed on Nov. 20, 2014. (4 pages—see entire document).
Supplementary European Search Report in European application No. 10841973.0, mailed on Feb. 5, 2015. (13 pages—see entire document).
3rd Generation Partnership Project; Technical Specification Group Radio Access Network; Evolved Universal Terrestrial Radio Access (E-UTRA); Physical layer for relaying operation (Release 10); 3GPP TS 36.216 V10.3.1; Sep. 2011. (16 pages—see entire document).

* cited by examiner

MAPPING AND RESOURCE ALLOCATION METHOD FOR RELAY LINK-PHYSICAL DOWNLINK SHARED CHANNEL

TECHNICAL FIELD

The present disclosure relates to the field of wireless mobile communication, particularly to a mapping and resource allocation method and apparatus for Relay link-Physical Downlink Shared Channel (R-PDSCH).

BACKGROUND

A Long Term Evolution (LTE) system, a Long Term Evolution-Advanced (LTE-A) system, an International Mobile Telecommunication Advanced (IMT-Advanced) system are all based on the technique of Orthogonal Frequency Division Multiplexing (OFDM). A time-frequency two-dimensional data form is mainly adopted in the OFDM system. In the LTE and the LTE-A, a Resource Block (RB, when the RB is mapped on to the physical resource, the RB is called a Physical Resource Block (PRB)) is defined as OFDM symbols inside a slot on a time domain, and 12 or 24 subcarriers on a frequency domain, so that one RB consists of $N_{symb} \times N_{sc}^{RB}$ resource elements (RE), wherein the $N_{symb}$ indicates the number of the OFDM symbols inside one slot, and $N_{sc}^{RB}$ indicates the number of subcarriers occupied by the RB on the frequency domain. That is to say, the resource block refers to a plurality of subcarriers (for example, 12 subcarriers) occupied in the frequency direction and all OFDM symbols occupied inside one slot in the time direction; and a resource block pair refers to a pair of resource blocks corresponding to two slots in one subframe (in the frame structure shown in FIG. 2, a wireless frame comprises ten subframes, and each subframe comprises 2 slots. In the case of normal cyclic prefix, one slot comprises seven OFDM symbols, and in the case of extended cyclic prefix, one slot comprises six OFDM symbols).

Moreover, the concept of resource block group is also defined in the system, that is, a plurality of continuous resource blocks forms a resource block group. The size of the resource block group is determined by the system bandwidth. For example, when the system bandwidth is less than or equals to ten resource blocks, the resource block group comprises 1 resource block. For another example, when the system bandwidth is 11 to 26 resource blocks, the resource block group consists of 2 resource blocks. For another example, when the system bandwidth is 27 to 63 resource blocks, the resource block group consists of three resource blocks; and when the system bandwidth is 64 to 110 resource blocks, the resource block group consists of four resource blocks.

Figure 1:
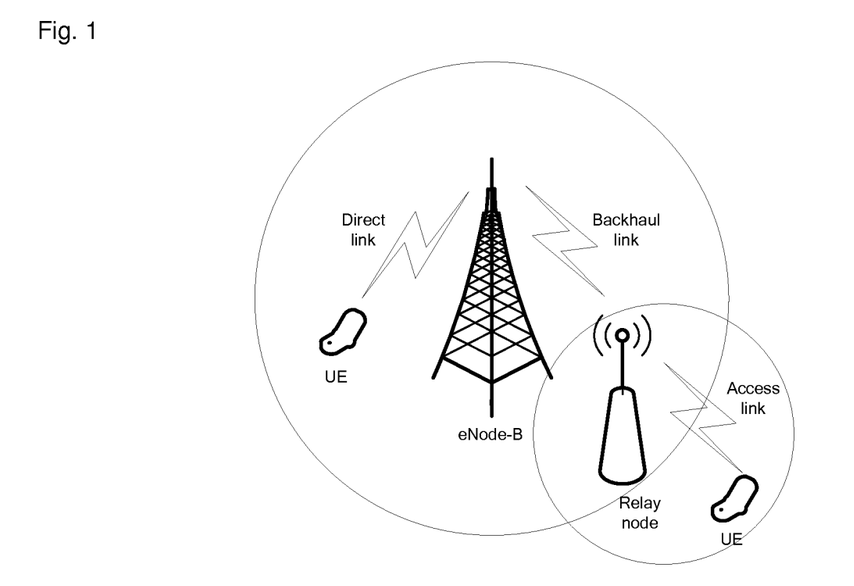
FIG. 1 shows a structural diagram of a conventional relay system.

In the LTE-A system, a new link is added after the Relay Node (RN) is introduced, as is shown in FIG. 1, the link between an eNode-B and a relay is called a backhaul link or relay link; the link between the relay and the User Equipment (UE) is called an access link; and the link between the eNode-B and the UE is called a direct link.

At present, it is a hotspot, in the LTE-A system, of researching the multiplex mode between a control channel and a traffic channel after a relay node is introduced, for example, Time Division Multiplex (TDM), Frequency Division Multiplex (FDM), and FDM+TDM are adopted for multiplexing. However, the research on resource allocation for R-PDSCH has not been developed, which is the problem the present disclosure aims to solve. Wherein TDM refers to that the Relay link-Physical Downlink Control Channel (R-PDCCH) and R-PDSCH are transmitted in different OFDM symbols;

FDM refers to that the R-PDCCH and the R-PDSCH are transmitted in different PRBs;

FDM+TDM refers to that the R-PDCCH and the R-PDSCH are transmitted in identical or different PRBs.

A PDCCH includes at least DL grant and UL grant. For PDCCH, the DL grant and the UL grant are carried on the first, the first two, the first three or the first four OFDM symbols of the first slot, and occupy the whole system bandwidth in the frequency direction. For R-PDCCH, the DL grant is carried on the available OFDM symbols of the first slot, the UL grant is carried on the available OFDM symbols of the second slot, and the DL grant and the UL grant occupy a plurality of resource blocks in the frequency direction, and the occupied maximal band width can be up to the whole system bandwidth.

So far, there has not been proposed a mapping and resource allocation method for R-PDSCH.

SUMMARY

The technical problem to be solved by the present disclosure is to provide a mapping and resource allocation method and apparatus for R-PDSCH, which is well applicable to the link between an eNode-B and a relay node, thereby ensuring the backward compatibility (compatible with the LTE system), and also solving the problem of mapping and resource allocation of the R-PDSCH.

To solve the problem above, the present disclosure provides a mapping and resource allocation method for R-PDSCH, including: when resources allocated for a R-PDCCH overlap with resources allocated for the R-PDSH, data of the R-PDSCH is not mapped or sent on allocated over-lapped resources, or the data of the R-PDSCH to be sent on the over-lapped resources is punctured; the data of the R-PDSCH is mapped and sent on all or partial resources which are not occupied by R-PDCCH; a receiving end receives the data according to the mapping method for the R-PDSCH.

Furthermore, when resources allocated for DL grant of the R-PDCCH overlap with the resource allocated for the R-PDSCH, the data of the R-PDSCH may not be mapped or sent on resources occupied by the DL grant, or the data of the R-PDSCH to be sent on the resources occupied by the DL grant may be punctured; and the data of the R-PDSCH may be mapped and sent on all or partial resources which are not occupied by the DL grant.

Furthermore, when resources allocated for UL grant of the R-PDCCH overlap with the resource allocated for the R-PDSCH, the data of the R-PDSCH may not be mapped or sent on resources occupied by the UL grant, or the data of the R-PDSCH to be sent on the resources occupied by the UL grant may be punctured; and the data of the R-PDSCH may be mapped and sent on all or partial resources which are not occupied by the UL grant.

Furthermore, when resources allocated for DL and UL grant of the R-PDCCH overlap with the resource allocated for the R-PDSCH, the data of the R-PDSCH may not be mapped or sent on resources occupied by the DL and UL grant, or the data of the R-PDSCH to be sent on the resources occupied by the DL and UL grant may be punctured; and the data of the R-PDSCH may be mapped and sent on all or partial allocated resources which are not occupied by the DL and UL grant.

Furthermore, a resource allocation mode corresponding to a shared channel in an LTE system may be reused or a grouping-tree resource allocation mode may be used to allocate resources for the R-PDSCH.

Furthermore, the reused resource allocation mode corresponding to the shared channel in the LTE system may be a resource allocation mode corresponding to each resource allocation domain in a downlink control format transmitted by a PDCCH from an eNode-B to a UE.

Furthermore, the downlink control format may include format 0, format 1 /1A/1B/1C/1D and format 2/2A.

Furthermore, one of the following items may be reused in the resource allocation for the R-PDSCH: resource block assignment and hopping resource allocation in the format 0; resource allocation header and resource block assignment in the format 1/2/2A; localized/distributed VRB assignment flag and resource block assignment in the format 1A/1B/1D; resource block assignment in the format 1C.

Furthermore, the grouping-tree resource allocation mode may include: grouping resource blocks, or resource block pairs or frequency resources, and performing tree-shaped resource allocation on the grouped resources, wherein bit number of position information is $\lceil \log_2(n \cdot (n+1)/2) \rceil$ when the grouping-tree resource allocation mode is adopted, where n refers to number of available groups, and $\lceil \; \rceil$ refers to ceiling.

Furthermore, when the R-PDSCH carries data of a UE of R8, or R9 or R10, the R-PDSCH may refer to a Physical Downlink Shared Channel (PDSCH) from an eNode-B to the UE.

Furthermore, when the resources allocated for the R-PDCCH overlap with the resources allocated for the PDSCH from the eNode-B to the UE of R8 or R9, the data of the PDSCH to be sent on the over-lapped resources may be punctured;

when the resources allocated for the R-PDCCH overlap with the resources allocated for the PDSCH from the eNode-B to the UE of R10, the data of the PDSCH may not be mapped or sent on the over-lapped resource, or the data of the PDSCH to be sent on the overlapped resources may be punctured.

A mapping and resource allocation method for R-PDSCH includes:

a resource allocation mode corresponding to a shared channel in an LTE system is reused or a grouping-tree resource allocation mode is used to allocate resources for the R-PDSCH;

when resources allocated for a R-PDCCH overlap with resources allocated for the R-PDSCH, data of the R-PDSCH is not mapped or sent on over-lapped resources, or the data of the R-PDSCH to be sent on the over-lapped resources is punctured.

The present disclosure also provides a mapping and resource allocation apparatus for R-PDSCH. The apparatus includes a mapping module configured to map R-PDSCH, and a resources allocation module configured to reuse a resource allocation mode corresponding to a shared channel in an LTE system or use a grouping-tree resource allocation mode to allocate resources for the R-PDSCH.

Furthermore, the mapping module may be configured to map and send data of the R-PDSCH on all or partial resources which are not occupied by DL grant and/or UL grant.

Furthermore, the reused resource allocation mode corresponding to the shared channel in the LTE system may be a resource allocation mode corresponding to each resource allocation domain in a downlink control format transmitted by a PDCCH from an eNode-B to a UE.

Furthermore, the resource allocation module may be configured to adopt the grouping-tree resource allocation mode which includes: grouping resource blocks, or resource block pairs or frequency resources, and performing tree-shaped resource allocation on the grouped resources, wherein bit number of position information is $\lceil \log_2(n \cdot (n+1)/2) \rceil$ when the grouping-tree resource allocation mode is adopted, where n refers to number of available groups, and $\lceil \; \rceil$ refers to ceiling.

Furthermore, the apparatus may further include a shunning module configured to, when resources allocated for a R-PDCCH overlap with the resources allocated for the R-PDSCH, not map or send data of the R-PDSCH on the over-lapped resources.

Furthermore, the apparatus may further include a puncturing module configured to, when resources allocated for a R-PDCCH overlap with the resources allocated for the R-PDSCH, puncture data of the R-PDSCH on the over-lapped resources.

Furthermore, the shunning module may further be configured to, when the resources allocated for the R-PDCCH overlap with the resources allocated for the R-PDSCH from an eNode-B to a UE of R10, not map or send the data of the R-PDSCH on the over-lapped resources.

Furthermore, the puncturing module may further be configured to, when the resources allocated for the R-PDCCH overlap with the resources allocated for the R-PDSCH from an eNode-B to a UE of R8, R9 or R10, puncture data of the R-PDSCH on the over-lapped resources.

The mapping and resource allocation method for R-PDSCH provided by the present disclosure, can be well applicable to the link between the eNode-B and the relay node, and the resource allocation mode is flexible, the signaling overhead is lowered, therefore, not only the backward compatibility (compatible with the LTE system) is ensured, but also the problem of mapping and resource allocation of the R-PDSCH is solved.

DETAILED DESCRIPTION

Figure 2:
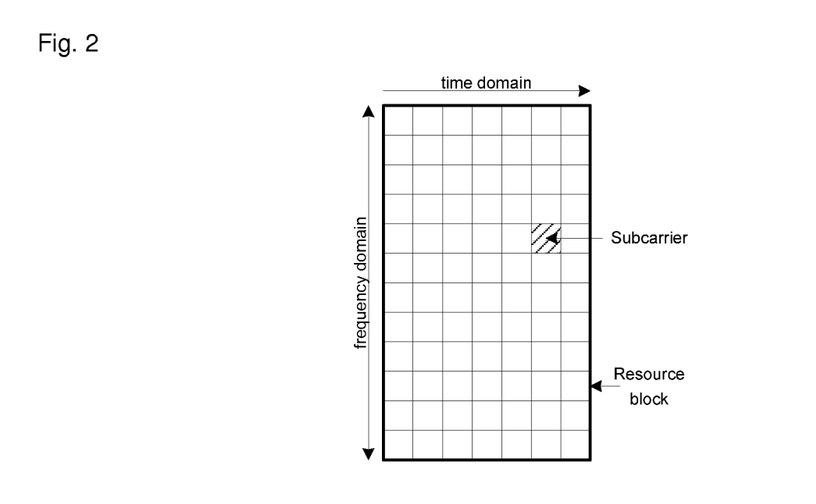
FIG. 2 shows a diagram of the resource block and subcarrier.

In order to make description more clearly, some relevant terms are introduced. As shown in FIG. 2, "resource block" refers to a plurality of subcarriers (for example, 12 subcarriers) occupied in the frequency direction and all OFDM symbols occupied inside one slot in the time direction; "resource block pair" refers to a pair of resource blocks corresponding to two slots in one subframe; "frequency resource" refers to a plurality of subcarriers (for example, 12 subcarriers) occupied in the frequency direction, and a plurality of OFDM symbols, or all OFDM symbols in a slot or in a subframe in the time direction. When the frequency resource occupies all OFDM symbols in one slot or in one subframe in the time direction, the frequency resource equals to the resource block or the resource block pair.

The basic idea of the present disclosure is: when resources allocated for R-PDCCH overlap with resources allocated for R-PDSCH, data of the R-PDSCH is not mapped or sent on the over-lapped resources in the allocated resources, or the data of the R-PDSCH to be sent on the over-lapped resources is punctured; the data of the R-PDSCH is mapped and sent on all or partial resources, in the allocated resources, which are not occupied by the R-PDCCH; and the receiving end receives data according to the mapping method for the R-PDSCH.

Specifically:

when resources allocated for the DL grant of the R-PDCCH overlap with resources allocated for the R-PDSCH, the data of the R-PDSCH is not mapped or sent on the resources occupied by the DL grant, or the data of the R-PDSCH to be sent on the resources occupied by the DL grant is punctured; the data of the R-PDSCH is mapped and sent on all or partial allocated resources which are not occupied by the DL grant;

when resources allocated for the UL grant of the R-PDCCH overlap with resources allocated for the R-PDSCH, the data of the R-PDSCH is not mapped or sent on the resources occupied by the UL grant, or the data of the R-PDSCH to be sent on the resource occupied by the UL grant is punctured; and the data of the R-PDSCH is mapped and sent on all or partial allocated resources which are not occupied by the UL grant; and when resources allocated for the DL and UL grant of the R-PDCCH overlap with resources allocated for the R-PDSCH, the data of the R-PDSCH is not mapped or sent on the resources occupied by the DL grant and the UL grant, or the data of the R-PDSCH to be sent on the resources occupied by the DL grant and the UL grant is punctured; and the data of the R-PDSCH is mapped and sent on all or partial allocated resources which are not occupied by the DL grant and the UL grant.

A resource allocation mode corresponding to a shared channel in an LTE system is reused or a grouping-tree resource allocation mode is used to allocate resources for the R-PDSCH. Specifically, A resource allocation mode reused by the R-PDSCH is the same as the resource allocation mode corresponding to the PDSCH or the PUSCH between the eNode-B and the UE in the LTE system, i.e. a resource allocation model corresponding to each resource allocation domain in the downlink control format transmitted by the PDCCH between the eNode-B and the UE.

The downlink control format transmitted by the PDCCH between the eNode-B and the UE in the LTE system includes format 0, format 1/1A/1B/1C/1D and format 2/2A. Particularly, one of the following items can be reused in the resource allocation for R-PDSCH: 1) the resource block assignment and hopping resource allocation in format 0, here, the uplink resource allocation is applied to the downlink resource allocation, and the parameters corresponding to the original uplink represent the parameters corresponding to the downlink; 2) the resource allocation header and resource block assignment in format 1/2/2A; 3) localized/distributed VRB (Virtual Resource Block) assignment flag and resource block assignment in the format 1A/1B/1D; and 4) resource block assignment in the format 1C.

Particularly, the R-PDSCH uses a resource allocation model which is different from the resource allocation model corresponding to the PDSCH or the PUSCH between the eNode-B and the UE in the LTE system. A grouping-tree resource allocation mode is adopted and presents a grouping position of continuous resource blocks or the resource block pairs or the frequency resources started from any positions, namely the resource blocks, the resource blocks pair or the frequency resources are grouped first, and then tree-shaped resource allocation is performed on the grouped resources, wherein the bit number of the position information is $\lceil \log_2(n \cdot (n+1)/2) \rceil$ when the grouping-tree resource allocation mode is adopted, where n refers to the number of available groups, and $\lceil\ \rceil$ refers to ceiling.

The present disclosure is described below with reference to the accompanying drawings and embodiments in detail.

Figure 3:
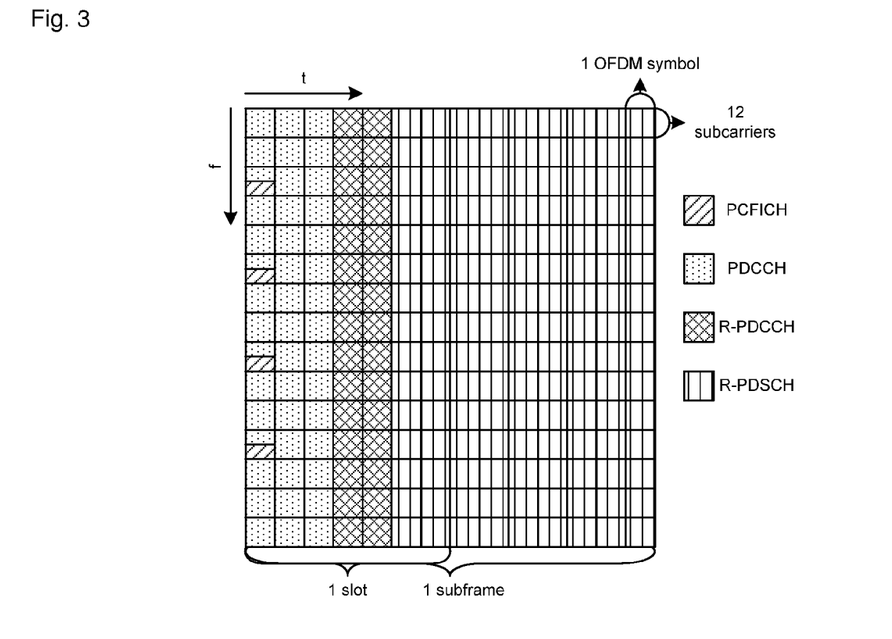
FIG. 3 shows a diagram of R-PDCCH and R-PDSCH in TDM mode.

Embodiment 1: FIG. 3 shows a diagram of R-PDCCH and R-PDSCH in TDM mode, as is shown in FIG. 3, when the R-PDSCH is used for carrying the data of the UE of R8 (Release 8 version), or R9 (Release 9 version)or R10 (Release 10 version), the R-PDSCH refers to PDSCH. Here, when the resources allocated for the R-PDCCH overlap with the resources allocated for the PDSCH from the eNode-B to the UE of R8 or R9, the data of the PDSCH from the eNode-B to the UE of R8 or R9 on the overlapped resources is punctured. When the resources allocated for the R-PDCCH overlap with the resources allocated for the PDSCH from the eNode-B to the UE of R10, a shunning strategy is adopted for PDSCH, or the data of the PDSCH on the over-lapped resources is punctured. The shunning strategy refers to that no data is mapped or sent on the overlapped resources which are carried with the shared channel corresponding to the R-PDCCH. The puncturing refers to that: the resource mapping is performed assumed there is no R-PDCCH, and data which is to be sent on the overlapped resources is wiped out when overlap occurs.

Figure 4:
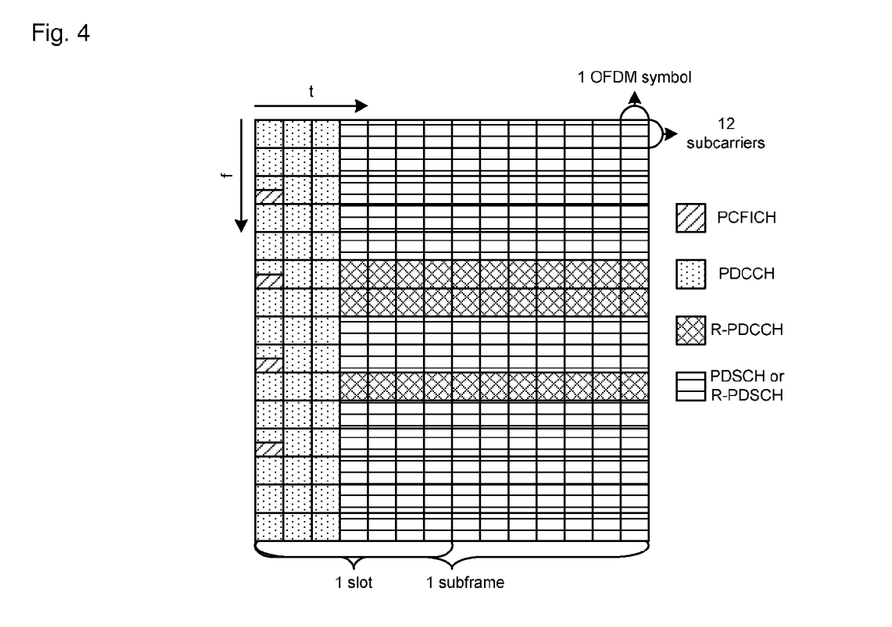
FIG. 4 shows a diagram of R-PDCCH and R-PDSCH in FDM mode.

Embodiment 2: FIG. 4 shows a diagram of R-PDCCH and the R-PDSCH in FDM mode, as is shown in FIG. 4, the shared channel can be used for carrying data of the UE of R8, or R9 or R10. If there are two RNs, i.e. RN1 and RN2, are scheduled in the system, and if the resources allocated for the R-PDCCH do not overlap with the resources allocated for the PDSCH from the eNode-B to the UE, then no puncturing or shunning operation is performed on the PDSCH.

The R-PDCCH corresponding to RN1 occupies two slots in the sixth resource block pair, wherein the DL grant occupies the first slot, the UL grant occupies the second slot, and the R-PDSCHs corresponding RN1 are allocated on two slots in the first to fifth resource pairs (counting from the bottom up in the figure). For RN1, the resources allocated for the DL grant and the UL grant do not overlap with the resources allocated for the R-PDSCH, therefore no puncturing or shunning operation are performed on the R-PDSCH corresponding to RN1.

The R-PDCCH corresponding to RN2 occupies two slots in the ninth and tenth resource block pairs, wherein the DL grant occupies the first slot, the UL grant occupies the second slot, and the corresponding R-PDSCHs are allocated on two slots in the ninth to twelfth resource block pairs. For RN2, the resources allocated for the DL grant and UL grant overlap with the resources allocated for the R-PDSCH on the two slots in the ninth and tenth resource block pairs, therefore puncturing or shunning operation needs to be performed on the R-PDSCH corresponding to RN2. Puncturing or shunning operation can be known from Embodiment 1. By taking the shunning operation as an example, the data of the R-PDSCH is not mapped or sent on the two slots in the ninth and tenth resource block pairs, but mapped and sent on the two slots in the eleventh and twelfth resource blocks.

Figure 5:
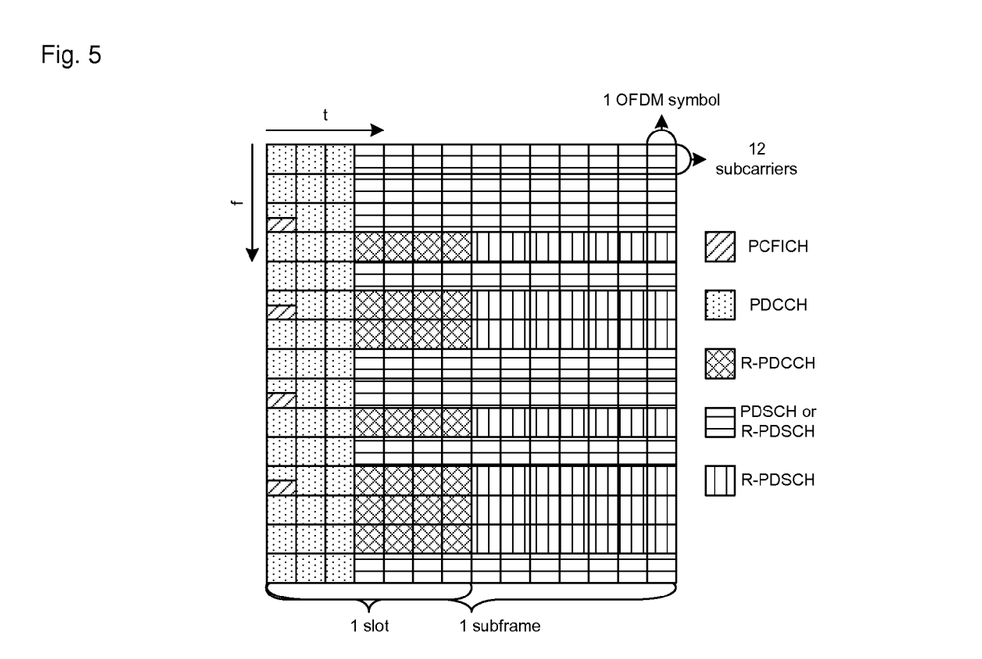
FIG. 5 shows a diagram of R-PDCCH and R-PDSCH in FDM and TDM mode.

Embodiment 3: FIG. 5 shows a diagram of R-PDCCH and R-PDSCH in FDM and TDM mode. It is supposed that 4 RNs, i.e. RN1RN2, RN3 and RN4, are scheduled in the system, and as is shown is FIG. 5, in Embodiment 3, the second, third, fourth, sixth, ninth, tenth and twelfth resource block pairs include R-PDCCHs of 4 RNs which are interleaved together.

The R-PDCCH corresponding to RN1 occupies the first slot in the second, third, fourth, sixth, ninth, tenth and twelfth resource block pairs, and carries DL grant, and the R-PDSCH corresponding to RN1 is allocated on two slots in the second, third, fourth, sixth, ninth, tenth and twelfth resource block pairs. For RN1, the resources allocated for the DL grant overlaps with the resources allocated for the R-PDSCH on the first slot in the second, third, fourth, sixth, ninth, tenth and twelfth resource block pairs, therefore the shunning puncturing operation needs to be performed on the R-PDSCH corresponding to RN1. Puncturing or shunning operation can be known from Embodiment 1. By taking the shunning operation as an example, the data of the R-PDSCH is not mapped or sent on the first slot in the second, third, fourth, sixth, ninth, tenth and twelfth resource block pairs, but is mapped and sent on the second slot in the second, third, fourth, sixth, ninth, tenth and twelfth resource block pairs.

The R-PDCCHs corresponding to RN2, RN3 and RN4 occupies the first slot in the second, third, fourth, sixth, ninth, tenth and twelfth resource block pairs and carries DL grant. It is supposed that the DL grant does not overlap with the resources allocated for R-PDSCHs corresponding to RN2, RN3, RN4, therefore no puncturing or shunning operation are performed on the R-PDSCHs corresponding to RN2, RN3 and RN4.

Embodiment 4: FIG. 5 shows the diagram of R-PDCCH and R-PDSCH in FDM and TDM mode. It is supposed that 4 RNs, i.e. RN1, RN2, RN3 and RN4, are scheduled in the system, as is shown in FIG. 5, the R-PDCCH corresponding to RN1 occupies the first slot in the second, third and fourth resource block pairs and carries DL grant, the R-PDSCH corresponding to RN1 is allocated on the two slots in the first to fourth resource block pairs. For RN1, the resources allocated for the DL grant overlap with the resources allocated for the R-PDSCH on the first slot in the second to fourth resource block pairs, therefore puncturing or shunning operation is performed on the R-PDSCH corresponding to RN1. Puncturing or shunning operation can be known from Embodiment 1. By taking the shunning operation as an example, the data of the R-PDSCH is not mapped or sent on the first slot in the second to fourth resource block pairs, but mapped and sent on the second slot in the second to fourth resource block pairs, and also mapped and sent on the two slots in the first resource block pair, that is to say, the data of the R-PDSCH corresponding to RN1 is mapped and sent on all available resources which are not occupied by the DL grant.

The R-PDCCH corresponding to RN2 occupies the first slot in the sixth resource block pair and carries DL grant, the R-PDSCH corresponding to RN2 is allocated on the two slots in the sixth resource block pair. For RN2, the resources allocated for the DL grant overlap with the resources allocated for the R-PDSCH on the first slot in the sixth resource block pair, therefore puncturing or shunning operation needs to be performed on the R-PDSCH corresponding to RN2. Puncturing or shunning operation can be known from Embodiment 1. By taking the shunning operation as an example, the data of the R-PDSCH is not mapped or sent on the first slot in the sixth resource block pair, but mapped and sent on the second slot in the sixth resource block pair.

The R-PDCCH corresponding to RN3 occupies the first slot in the ninth and tenth resource block pairs and carries DL grant, and the R-PDSCH corresponding to RN3 is allocated on the two slots in the eighth and eleventh resource block pairs. For RN3, the resources allocated for the DL grant do not overlap with the resources allocated for R-PDSCH, so that no puncturing or shunning operation is performed on the R-PDSCH corresponding to RN3.

The R-PDCCH corresponding to RN4 occupies the first slot in the twelfth resource block pair and carries DL grant, and the R-PDSCH corresponding to RN4 is allocated on the two slots in the twelfth to fifteenth resource block pairs. For RN4, the resources allocated for the DL grant overlap with the resources allocated for the R-PDSCH on the first slot in the twelfth resource block pair, therefore puncturing or shunning operation needs to be performed on the R-PDSCH corresponding to RN4. Puncturing or shunning operation can be known from Embodiment 1. By taking the shunning operation as an example, the data of the R-PDSCH is not mapped or sent on the first slot in the twelfth resource block pair, and no data is mapped or sent on the second slot in the twelfth resource block pair, or the UL grant is mapped and sent on the second slot in the twelfth resource block pair, the data of the R-PDSCH is mapped and sent on the two slots in the thirteenth to fifteenth resource block pairs, that is to say, the data of the R-PDSCH corresponding to RN4 is mapped and sent on the available resources which is not occupied by the DL grant.

Embodiment 5: the grouping-tree resource allocation mode is adopted. The following table, agreed in the LTE, indicates resource block grouping rules under conditions of different system bandwidths. In this embodiment, there are 15 resource blocks in the frequency direction, it is determined, according to table 1, that the system bandwidth is within the region of 11 to 26 resource blocks, each resource block group consists of two resource blocks, the number of the groups is n=⌈15/2⌉=8, namely 8 groups, then where ⌈$\log_2$(8·(8+1)/2)⌉=6, where ⌈ ⌉ refers to ceiling. The 6 bits indicates a grouping position of continuous resource blocks started from any positions, and all the resource blocks or resource block pairs in the group can carry the R-PDSCH.

TABLE 1

| System Bandwidth $N_{RB}^{DL}$ | RBG Size (P) |
|---|---|
| ≤10 | 1 |
| 11-26 | 2 |
| 27-63 | 3 |
| 64-110 | 4 |

On the basis of the same inventive concept, the embodiment of the present disclosure also provides a resource allocation apparatus for R-PDSCH, the principle for solving problems by this apparatus is the same as that by the resource allocation method for R-PDSCH, so please the implementation of the apparatus can be known from the implementation of the method, and tautology is omitted.

Figure 6:
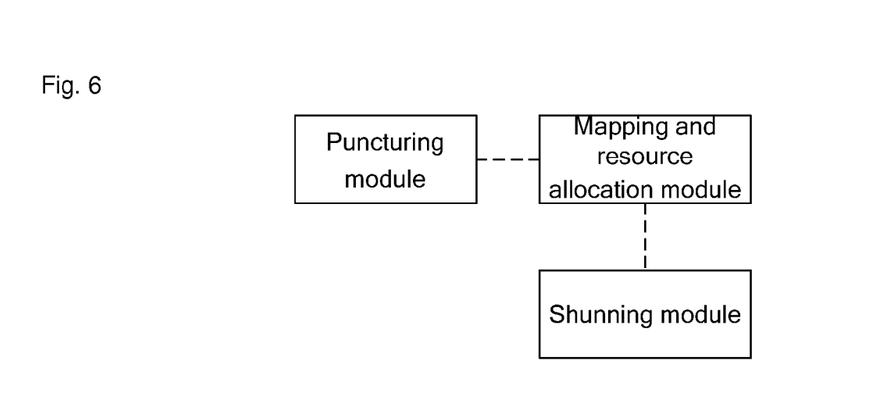
FIG. 6 shows a structural diagram of an apparatus disclosed by the present disclosure.

FIG. 6 shows a structure diagram of a resource allocation apparatus for R-PDSCH in the present disclosure, as shown in FIG. 6, the apparatus includes a mapping and resource allocation module configured to map R-PDSCH, wherein a resource allocation mode corresponding to a shared channel in an LTE system is reused or a grouping-tree resource allocation mode is used to allocate resources for the R-PDSCH.

The reused resource allocation mode corresponding to the shared channel in the LTE system is a resource allocation mode corresponding to each resource allocation domain in a downlink control format transmitted by a PDCCH from an eNode-B to a UE.

The resource allocation module is configured to adopt the grouping-tree resource allocation mode which comprises: grouping resource blocks, or resource block pairs or frequency resources, and performing tree-shaped resource allocation on the grouped resources, wherein bit number of position information is ⌈$\log_2(n \cdot (n+1)/2)$⌉ when the grouping-tree resource allocation mode is adopted, where n refers to number of available groups, and ⌈ ⌉ refers to ceiling.

The mapping and resource allocation module is configured to map and send data of the R-PDSCH on all or partial resources which are not occupied by DL grant and/or UL grant. Specifically:

when resources allocated for DL grant of the R-PDCCH overlap with the resource allocated for the R-PDSCH, the data of the R-PDSCH is not mapped or sent on resources occupied by the DL grant, or the data of the R-PDSCH to be sent on the resources occupied by the DL grant is punctured; and the data of the R-PDSCH is mapped and sent on all or partial resources which are not occupied by the DL grant;

when resources allocated for UL grant of the R-PDCCH overlap with the resource allocated for the R-PDSCH, the data of the R-PDSCH is not mapped or sent on resources occupied by the UL grant, or the data of the R-PDSCH to be sent on the resources occupied by the UL grant is punctured; and the data of the R-PDSCH is mapped and sent on all or partial resources which are not occupied by the UL grant;

when resources allocated for DL and UL grant of the R-PDCCH overlap with the resource allocated for the R-PDSCH, the data of the R-PDSCH is not mapped or sent on resources occupied by the DL and UL grant, or the data of the R-PDSCH to be sent on the resources occupied by the DL and UL grant is punctured; and the data of the R-PDSCH is mapped and sent on all or partial resources which are not occupied by the DL and UL grant.

As is shown in FIG. 6, the apparatus of the present disclosure further includes a shunning module configured to, when resources allocated for a R-PDCCH overlap with the resources allocated for the R-PDSCH, not map or send data of the R-PDSCH on the over-lapped resources. The shunning module is further configured to, when the resources allocated for the R-PDCCH overlap with the resources allocated for the R-PDSCH from an eNode-B to a UE of R10, not map or send the data of the R-PDSCH on the over-lapped resources.

As is shown in FIG. 6, the apparatus of the present disclosure further includes a puncturing module configured to, when resources allocated for a R-PDCCH overlap with the resources allocated for the R-PDSCH, puncture data of the R-PDSCH on the over-lapped resources. The puncturing module is further configured to, when the resources allocated for the R-PDCCH overlap with the resources allocated for the R-PDSCH from an eNode-B to a UE of R8, R9 or R10, puncture data of the R-PDSCH on the over-lapped resources.

Certainly, there may be various other embodiments included in the present disclosure. Those skilled in the art can, without departing from the principle of the present disclosure, make various corresponding changes and modifications, which shall fall within the protection scope of the present disclosure.

The invention claimed is:

1. A mapping and resource allocation method for Relay link-Physical Downlink Shared Channel (R-PDSCH), implemented by an eNode-B or a relay node, comprising:

not mapping or not sending data of a R-PDSCH on over-lapped resources, or puncturing the data of the R-PDSCH to be sent on the over-lapped resources, when resources allocated for a Relay link-Physical Downlink Control Channel (R-PDCCH) overlap with resources allocated for the R-PDSCH;

wherein a resource allocation mode corresponding to a shared channel in an Long Term Evolution (LTE) system is reused or a grouping-tree resource allocation mode is used to allocate resources for the R-PDSCH; and wherein the grouping-tree resource allocation mode comprises: grouping resource blocks, or resource block pairs or frequency resources, and performing tree-shaped resource allocation on the grouped resources, wherein bit number of position information is $\lceil \log_2(n \cdot (n+1)/2) \rceil$ when the grouping-tree resource allocation mode is adopted, where n refers to number of available groups, and $\lceil \ \rceil$ refers to rounding upwards.

2. The method according to claim 1, wherein when resources allocated for DownLink (DL) grant of the R-PDCCH overlap with the resource allocated for the R-PDSCH, the data of the R-PDSCH is not mapped or not sent on resources occupied by the DL grant, or the data of the R-PDSCH to be sent on the resources occupied by the DL grant is punctured; and the data of the R-PDSCH is mapped and sent on all or partial allocated resources which are not occupied by the DL grant.

3. The method according to claim 2, further comprising: receiving, by a receiving end, the data according to the mapping method for the R-PDSCH.

4. The method according to claim 1, wherein when resources allocated for UpLink (UL) grant of the R-PDCCH overlap with the resource allocated for the R-PDSCH, the data of the R-PDSCH is not mapped or not sent on resources occupied by the UL grant, or the data of the R-PDSCH to be sent on the resources occupied by the UL grant is punctured; and the data of the R-PDSCH is mapped and sent on all or partial allocated resources which are not occupied by the UL grant.

5. The method according to claim 1, wherein when resources allocated for DL and UL grant of the R-PDCCH overlap with the resource allocated for the R-PDSCH, the data of the R-PDSCH is not mapped or not sent on resources occupied by the DL and UL grant, or the data of the R-PDSCH to be sent on the resources occupied by the DL and UL grant is punctured; and the data of the R-PDSCH is mapped and sent on all or partial allocated resources which are not occupied by the DL and UL grant.

6. The method according to claim 1, wherein the reused resource allocation mode corresponding to the shared channel in the LTE system is a resource allocation mode corresponding to each resource allocation domain in a downlink control format transmitted by a Physical Downlink Control Channel (PDCCH) from an eNode-B to a UE.

7. The method according to claim 6, wherein the downlink control format comprises format 0, format 1/1A/1B/1C/1D and format 2/2A.

8. The method according to claim 7, wherein one of the following items is reused in the resource allocation for the R-PDSCH: resource block assignment and hopping resource allocation in the format 0; resource allocation header and resource block assignment in the format 1/2/2A; localized/distributed Virtual Resource Block (VRB) assignment flag and resource block assignment in the format 1A/1B/1D; resource block assignment in the format 1C.

9. The method according to claim 1, wherein when the R-PDSCH carries data of a UE of Release 8 version (R8), or Release 9 version (R9) or Release 10 version (R10), the R-PDSCH refers to a Physical Downlink Shared Channel (PDSCH) from an eNode-B to the UE.

10. The method according to claim 9, wherein when the resources allocated for the R-PDCCH overlap with the resources allocated for the PDSCH from the eNode-B to the UE of R8 or R9, the data of the PDSCH to be sent on the over-lapped resources is punctured;

when the resources allocated for the R-PDCCH overlap with the resources allocated for the PDSCH from the eNode-B to the UE of R10, the data of the PDSCH is not mapped or sent on the over-lapped resource, or the data of the PDSCH to be sent on the overlapped resources is punctured.

11. A mapping and resource allocation method for Relay link-Physical Downlink Shared Channel (R-PDSCH), implemented by an eNode-B or a relay node, comprising:
   reusing a resource allocation mode corresponding to a shared channel in an Long Term Evolution (LTE) system or using a grouping-tree resource allocation mode to allocate resources for the R-PDSCH;
   not mapping or not sending data of the R-PDSCH on over-lapped resources, or puncturing the data of the R-PDSCH to be sent on the over-lapped resources, when resources allocated for a Relay link-Physical Downlink Control Channel (R-PDCCH) overlap with resources allocated for the R-PDSCH;
   wherein the grouping-tree resource allocation mode comprises: grouping resource blocks, or resource block pairs or frequency resources, and performing tree-shaped resource allocation on the grouped resources, wherein bit number of position information is $\lceil \log_2(n \cdot (n+1)/2) \rceil$ when the grouping-tree resource allocation mode is adopted, where n refers to number of available groups, and $\lceil \ \rceil$ refers to rounding upwards.

12. The method according to claim 11, wherein when resources allocated for DownLink (DL) grant of the R-PDCCH overlap with the resource allocated for the R-PDSCH, the data of the R-PDSCH is not mapped or not sent on resources occupied by the DL grant, or the data of the R-PDSCH to be sent on the resources occupied by the DL grant is punctured; and
   the data of the R-PDSCH is mapped and sent on all or partial allocated resources which are not occupied by the DL grant.

13. The method according to claim 11, wherein when resources allocated for UpLink (UL) grant of the R-PDCCH overlap with the resource allocated for the R-PDSCH, the data of the R-PDSCH is not mapped or not sent on resources occupied by the UL grant, or the data of the R-PDSCH to be sent on the resources occupied by the UL grant is punctured; and
   the data of the R-PDSCH is mapped and sent on all or partial allocated resources which are not occupied by the UL grant.

14. The method according to claim 11, wherein when resources allocated for DL and UL grant of the R-PDCCH overlap with the resource allocated for the R-PDSCH, the data of the R-PDSCH is not mapped or not sent on resources occupied by the DL and UL grant, or the data of the R-PDSCH to be sent on the resources occupied by the DL and UL grant is punctured; and
   the data of the R-PDSCH is mapped and sent on all or partial allocated resources which are not occupied by the DL and UL grant.

15. The method according to claim 11, wherein the reused resource allocation mode corresponding to the shared channel in the LTE system is a resource allocation mode corresponding to each resource allocation domain in a downlink control format transmitted by a Physical Downlink Control Channel (PDCCH) from an eNode-B to a UE.

16. The method according to claim 15, wherein the downlink control format comprises: format 0, format 1/1A/1B/1C/1D and format 2/2A.

17. The method according to claim 16, wherein one of the following items is reused in the resource allocation for the R-PDSCH: resource block assignment and hopping resource allocation in the format 0; resource allocation header and resource block assignment in the format 1/2/2A; localized/distributed Virtual Resource Block (VRB) assignment flag and resource block assignment in the format 1A/1B/1D; resource block assignment in the format 1C.

18. The method according to claim 11, wherein when the R-PDSCH carries data of a UE of Release 8 version (R8), or Release 9 version (R9) or Release 10 version (R10), the R-PDSCH refers to a Physical Downlink Shared Channel (PDSCH) from an eNode-B to the UE.

19. The method according to claim 18, wherein when the resources allocated for the R-PDCCH overlap with the resources allocated for the PDSCH from the eNode-B to the UE of R8 or R9, the data of the PDSCH to be sent on the over-lapped resources is punctured;
   when the resources allocated for the R-PDCCH overlap with the resources allocated for the PDSCH from the eNode-B to the UE of R10, the data of the PDSCH is not mapped or sent on the over-lapped resource, or the data of the PDSCH to be sent on the overlapped resources is punctured.

20. The method according to claim 11, further comprising: receiving, by a receiving end, the data according to the mapping method for the R-PDSCH.

21. A mapping and resource allocation apparatus for Relay link-Physical Downlink Shared Channel (R-PDSCH), comprising:
   a mapping and resources allocation module configured to map R-PDSCH, wherein a resource allocation mode corresponding to a shared channel in an LTE system is reused or a grouping-tree resource allocation mode is used to allocate resources for the R-PDSCH;
   the mapping and resources allocation module is configured to not mapping or not sending data of the R-PDSCH on over-lapped resources, or puncture the data of the R-PDSCH to be sent on the over-lapped resources, when resources allocated for a Relay link-Physical Downlink Control Channel (R-PDCCH) overlap with resources allocated for the R-PDSCH;
   wherein the mapping and resources allocation module is configured to adopt the grouping tree resource allocation mode which comprises: grouping resource blocks, or resource block pairs or frequency resources, and performing tree-shaped resource allocation on the grouped resources, wherein bit number of position information is $\lceil \log_2(n \cdot (n+1)/2) \rceil$ when the grouping-tree resource allocation mode is adopted, where n refers to number of available groups, and $\lceil \ \rceil$ refers to rounding upwards.

22. The apparatus according to claim 21, wherein the mapping and resource allocation module is configured to map and send data of the R-PDSCH on all or partial allocated resources which are not occupied by DL grant and/or UL grant.

23. The apparatus according to claim 22, further comprising:
   a shunning module configured to, when resources allocated for a R-PDCCH overlap with the resources allocated for the R-PDSCH, not map or not send data of the R-PDSCH on the over-lapped resources.

24. The apparatus according to claim 23, wherein the shunning module is further configured to, when the resources allocated for the R-PDCCH overlap with the resources allocated for the R-PDSCH from an eNode-B to a UE of Release 10 version (R10), not map or not send the data of the R-PDSCH on the over-lapped resources.

25. The apparatus according to claim 22, further comprising:
a puncturing module configured to, when resources allocated for a R-PDCCH overlap with the resources allocated for the R-PDSCH, puncture data of the R-PDSCH on the over-lapped resources.

26. The apparatus according to claim 25, wherein the puncturing module is further configured to, when the resources allocated for the R-PDCCH overlap with the resources allocated for the R-PDSCH from an eNode-B to a UE of Release 8 version (R8), Release 9 version (R9) or Release 10 version (R10), puncture data of the R-PDSCH on the over-lapped resources.

27. The apparatus according to claim 21, wherein the reused resource allocation mode corresponding to the shared channel in the LTE system is a resource allocation mode corresponding to each resource allocation domain in a downlink control format transmitted by a Physical Downlink Control Channel (PDCCH) from an eNode-B to a UE.

28. The apparatus according to claim 27, further comprising:
a shunning module configured to, when resources allocated for a R-PDCCH overlap with the resources allocated for the R-PDSCH, not map or not send data of the R-PDSCH on the over-lapped resources.

29. The apparatus according to claim 28, wherein the shunning module is further configured to, when the resources allocated for the R-PDCCH overlap with the resources allocated for the R-PDSCH from an eNode-B to a UE of Release 10 version (R10), not map or not send the data of the R-PDSCH on the over-lapped resources.

30. The apparatus according to claim 27, further comprising:
a puncturing module configured to, when resources allocated for a R-PDCCH overlap with the resources allocated for the R-PDSCH, puncture data of the R-PDSCH on the over-lapped resources.

31. The apparatus according to claim 30, wherein the puncturing module is further configured to, when the resources allocated for the R-PDCCH overlap with the resources allocated for the R-PDSCH from an eNode-B to a UE of Release 8 version (R8), Release 9 version (R9) or Release 10 version (R10), puncture data of the R-PDSCH on the over-lapped resources.

32. The apparatus according to claim 21, further comprising:
a shunning module configured to, when resources allocated for a R-PDCCH overlap with the resources allocated for the R-PDSCH, not map or not send data of the R-PDSCH on the over-lapped resources.

33. The apparatus according to claim 32, wherein the shunning module is further configured to, when the resources allocated for the R-PDCCH overlap with the resources allocated for the R-PDSCH from an eNode-B to a UE of Release 10 version (R10), not map or not send the data of the R-PDSCH on the over-lapped resources.

34. The apparatus according to claim 21, further comprising:
a puncturing module configured to, when resources allocated for a R-PDCCH overlap with the resources allocated for the R-PDSCH, puncture data of the R-PDSCH on the over-lapped resources.

35. The apparatus according to claim 34, wherein the puncturing module is further configured to, when the resources allocated for the R-PDCCH overlap with the resources allocated for the R-PDSCH from an eNode-B to a UE of Release 8 version (R8), Release 9 version (R9) or Release 10 version (R10), puncture data of the R-PDSCH on the over-lapped resources.

* * * * *